United States Patent [19]

Kirchmayer

[11] Patent Number: 5,738,085
[45] Date of Patent: Apr. 14, 1998

[54] SOLAR COLLECTOR APPARATUS

[76] Inventor: Leonhard Kirchmayer, Gabelsbergerstr. 77, 2.Rueckgebaude II, Muenchen D-80333, Germany

[21] Appl. No.: 762,248

[22] Filed: Dec. 9, 1996

Related U.S. Application Data

[63] Continuation of Ser. No. 367,261, filed as PCT/EP93/01607, Jun. 23, 1993 published as WO94/01726, Jan. 20, 1994, abandoned.

[30] Foreign Application Priority Data

Jul. 1, 1992 [DE] Germany ............... 42 21 633.8

[51] Int. Cl.⁶ ..................................... F24J 2/46
[52] U.S. Cl. ........................... 126/704; 126/623
[58] Field of Search .................. 126/623, 704, 126/674

[56] References Cited

FOREIGN PATENT DOCUMENTS

| | | |
|---|---|---|
| 2381982 | 9/1978 | France . |
| 2614145 | 10/1977 | Germany . |
| 2905494 | 8/1980 | Germany . |
| 3934485 | 4/1991 | Germany . |

*Primary Examiner*—Carroll B. Dority
*Attorney, Agent, or Firm*—Jacobson, Price, Holman & Stern, PLLC

[57] ABSTRACT

A solar energy collector consists of a plurality of collector elements (5, 6, 7, 8) which can be secured on a preferably inclined supporting surface (2), for example a roof, and which have each a base body (9) with one or several collector channels lying in a plane (12) that faces the sun and connectable to a heat transfer fluid network, as well as possibly one or several absorber channels lying in a plane (13) transversely oriented to the collector channel. At least in the area of two parallel sides among its four sides, the base body (9) of the collector element is provided with a coupling stud (15) that extends transversely to the plane (14) of the base body, and at it opposite side, the base body (9) is provided with a coupling groove (17) whose dimensions are adapted to those of the coupling stud (15) and which receives the coupling stud (15) of the directly adjacent base body (9). Studs and grooves help to solidly anchor the base bodies to each other and at the same time to seal them with respect to the supporting surface. In order to be able to arrange the collector element both on north-south oriented roofs and on east-west oriented roofs without having to fear leaks, at least on the side of the base body provided with the first coupling stud (15) that extends transversely to the plane (14) of the base body is arranged a second coupling stud (16) which extends in the same direction. A second coupling groove (18) associated with this second coupling stud and whose dimensions are adapted to those of the second coupling stud (16) is arranged at the opposite side of the base body (9).

12 Claims, 1 Drawing Sheet

SOLAR COLLECTOR APPARATUS

This is a Continuation of nationalized PCT/EP93/01607 filed Jun. 23, 1993, published as WO94/01726, Jan. 20, 1994 and given U.S. Ser. No. 08/367,261, filed Jan. 3, 1995 which was abandoned upon the filing hereof.

BACKGROUND OF THE INVENTION

The invention relates to a solar collector apparatus comprised of a plurality of collector elements mountable on a preferably inclined support surface, e.g. a roof, which elements each comprise a basic structural body, wherewith the subject apparatus comprises one or more collector channels which can be connected to a heat transfer fluid network and are each disposed in a plane oriented generally toward the sun, and (possibly) one or more absorber channels which are each disposed in a plane oriented transversely to the planes of the collector channels;

wherewith the subject apparatus has the following features:

For each collector element, the lateral regions of at least two mutually parallel sides among the four sides of the basic structural body of the collector element are each [sic] provided with a coupling rail member which projects transversely with respect to the plane of the basic structural body and which serves for mutual fixed anchoring, as well as sealing with respect to the support surface; and The opposite sides of the basic structural body are provided with a respective coupling groove the dimensions of which correspond to those of the coupling rail member, which coupling groove serves to accommodate the coupling rail member of the adjacent basic structural body.

Known apparatuses of this type (Ger. OS 39 34 485) are mounted exclusively on the southerly inclined roof regions of so-called north-south roofs, with the collector channels and absorber channels extending parallel to the ridge of the roof. The collector elements are mounted such that the edge of the basic structural body, which edge extends around the coupling groove, is at a higher altitude than the downwardly projecting coupling rail member of the same basic structural body. This configuration and these mounting means for the collector elements satisfactorily provide the desired sealing effect.

However, if such known collector elements are mounted at a 90° azimuth to the aforesaid orientation, namely, if they are mounted on a so-called east-west roof, it has been found that the sealing effect of the coupling rail member and the coupling groove of corresponding dimensions, which groove is engaged by the rail member, is deficient. Additional sealing means are needed.

SUMMARY OF THE INVENTION

The underlying problem solved by the present invention is to devise a solar collector apparatus of the type described above, wherewith the collector elements of the apparatus can be disposed on either north-south roofs or on east-west roofs (azimuthally rotated 90 degrees with respect to north-south roofs) without risk of sealing-imperfections and without requiring special preparatory work to achieve a seal.

This problem is solved with the inventive solar collector apparatus, which is distinguished essentially in that, at least on the side of the basic structural body, which side bears the first coupling rail member (which member projects perpendicularly to the plane of the basic structural body), a second coupling rail member is provided which projects in the same direction; and in that the second rail member is associated with a second coupling groove having dimensions corresponding to those of the second rail member, which second groove is disposed on the opposite side of the basic structural body.

A solar collector apparatus comprised of collector elements configured in this manner can be mounted on a north-south roof or on an east-west roof (which latter roof extends at a 90° (azimuthal) angle to north-south roofs). Thus the described collector elements allow use on any roof. In addition, the apparatus provides a perfect seal. Accordingly, no specially adapted collector elements are required for individual installations—and thus efficiencies are afforded in the manufacturing of the collector elements and the apparatuses as a whole, without regard to the shape or orientation of the roof on which they are to be used.

In connection with the invention it has been found to be very advantageous if both the first and second coupling rail members are mounted on a given side of the basic structural body, both coupling rail members project downward, and both the first and second coupling grooves are disposed on the opposite side of the basic structural body from that of the coupling rail members and are configured to have their open side directed upward.

The first and second coupling rail members both extend from one and the same laterally projecting edge member of the basic structural body, i.e. the rail members are generally in the same plane. One can provide a more favorably strong and durable mutual anchoring of the collector elements by means distinguished in that the first coupling rail member is disposed at a different altitude from the second coupling rail member, and the first coupling groove (associated with the first coupling rail member) is disposed at a different altitude from the second coupling groove (associated with the second coupling rail member). This vertical displacement provides a coupling of neighboring collector elements which is more flexurally stiff and at the same time, it ensures that the two connections (each comprised of a coupling rail member and a coupling groove) do not suffer overload. Moreover, the labyrinthine path which rainwater is required to traverse in order to pass through the seal region is substantially lengthened.

The sealing effectiveness of the described apparatus can be further improved by providing at least one of the two coupling rail members in the region of the distal edge of its rail projection with a recess which is bounded on both sides by a respective narrow vane.

Preferably the pairwise rail-and-groove connections on a collector element are disposed on sides of the basic structural body which are parallel to the line of intersection of the planes of successive collector- and absorber channels. However, it is possible to provide analogous coupling elements on the two sides of the basic structural body which sides are transverse to the aforementioned sides, so as to provide means for coupling the collector elements also in the direction transverse to the primary coupling direction and provide a seal between the elements. One can achieve a practical form of coupling seal by the following means:

The pairwise rail-and-groove connections are provided only on the two longitudinal sides of the basic structural body (which sides extend parallel to the line of intersection of the planes of successive collector- and absorber channels; and A transversely extending wall step configuration is provided on each of the two transverse sides of the basic structural body, which sides extend transversely to the longitudinal sides, wherewith the wall step is disposed between a lower- and an upper lateral region of the wall of the basic structural body, wherewith the described wall configuration, together with the corresponding configuration on the neighboring collector element, forms a channel with a width corresponding to twice the width of the step; and A sealing strip is inserted into the channel, which strip covers the gap between the lower side regions of the adjoining basic structural bodies and extends across the width of the channel, and wherein the strip is comprised of elastic material, preferably silicone rubber.

The desired seal in the region of the transverse sides of the basic structural bodies is provided in a particularly simple and efficient manner if the length of the sealing strip corresponds to that of the overall channel in the solar collector apparatus which channel is formed by the successive individual channels.

It is particularly noteworthy that according to a refinement of the invention:

Each basic structural body has at least one throughgoing recess in its lower region, which recess, in combination with the corresponding recess on the adjoining basic structural body, delimits a throughgoing opening through which fasteners, preferably comprising a threaded bolt, for fixing the collector element to the support surface may pass; and The central strip-shaped region (web member) joining the two edge profiles of the sealing strip is sufficiently wide that when the sealing strip is inserted in the channel, the member extends over the upper part of the fastener which projects beyond the opening.

It has been found to be especially advantageous when using sealing strips of this type if, in the event the collector elements are disposed on the respective two inclined surfaces of an east-west roof up to the altitude of the ridge of the roof, a sealing strip is employed having a central (web) region (which region extends between the two edge profiles) the width of which region is such that the web region reliably spans the ridge.

For the purposes of manufacturing engineering and assembly, it is advantageous if the wall step configurations and their associated recesses extend in planes which are at higher altitudes than the plane of the first coupling rail member and the first coupling groove (which groove accommodates the first rail member, and at lower altitudes than the plane of the second coupling rail member and the second coupling groove (which groove accommodates the second rail member).

Additional details, advantages, and features of the invention will be evident from the following description with reference to the accompanying drawings; express reference is made to the drawings regarding any essential features not mentioned in the Specification.

DESCRIPTION OF THE PREFERRED EMBODIMENTS

Figure 1:
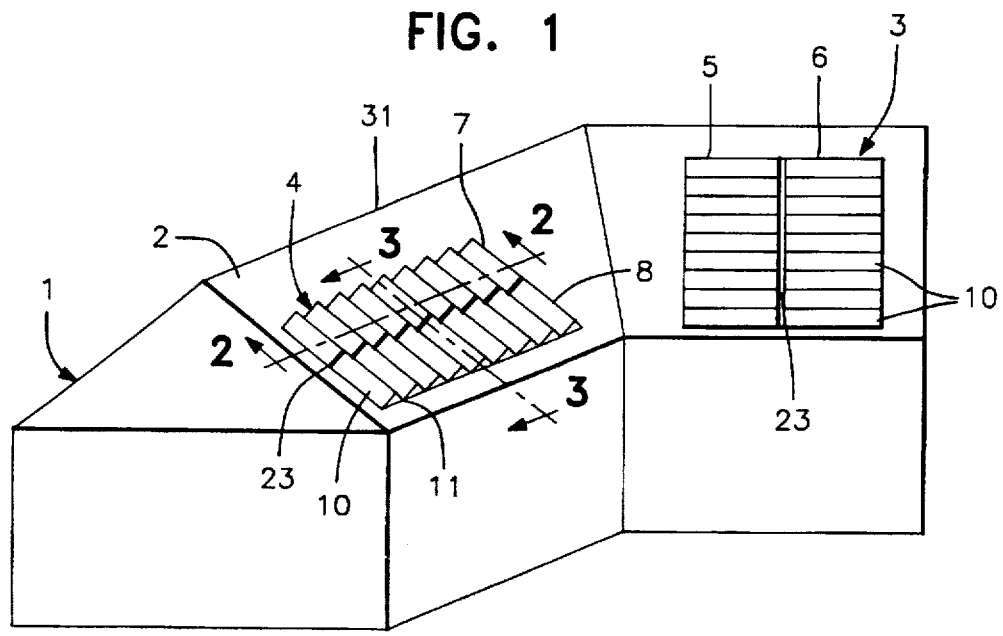
FIG. 1 is a perspective view of the arrangement of the solar collector apparatus mounted on a southern roof or an east-west roof.

The roof of the house shown schematically in FIG. 1 has a surface inclined at approximately 25° (from the horizontal), and serves as a support surface 2 for the solar collector apparatuses 3 and 4, which apparatuses are illustrated only schematically. Collector apparatus 3 is mounted on the support surface 2 of the southern roof of the house section, with the apparatus having an east-west primary orientation; and collector apparatus 4 is mounted on both support surfaces of the east-west roof of the house section, with the apparatus having a north-south primary orientation. In the perspective view illustrated only the apparatus 4 on the visible right-hand roof side is shown.

As shown schematically, each solar collector apparatus comprises a plurality of collector elements (5–8). Each such element has a base structure 9 comprising a plurality of "collector channels" 10 disposed in a plane directed toward the sun and connectable to a heat transfer fluid network, and a corresponding number of "absorber channels" 11 disposed in a plane oriented transversely to the collector channels 10.

These channels 10, 11 have configurations of known types and are rigidly affixed to the base structure 9 to form a unit construction. The planes of the exterior surfaces of the collector channels and absorber channels 10, 11 are shown schematically in FIG. 2 as planes 12 and 13, respectively. The planes 12 of the collector channels 10 are inclined at 26° to the plane 14 of the basic structure 9, thereby having an overall inclination (to the horizontal) of 51°. This overall inclination is very favorable at latitudes in Europe, because it provides optimal irradiation conditions in winter at a sun angle of approximately 18°. At the same time, satisfactory results are obtained at the higher summer altitude-angle of the sun.

In practice, each basic structure 9 comprises three sequential collector channel and absorber channel combination units. In contrast to the schematic representation in FIG. 1, in practice each set of collector elements (5; 6; 7; 8) has three basic structures 9, each of which structures has three combination units; thus 3×3=9 combination units are present in each of the sets (5–8) in the example illustrated. The relationships between two basic structures in a set are shown schematically in FIGS. 2 and 3.

For each basic structure 9, the lateral regions of two mutually parallel sides among the four sides of the basic structure 9 are provided with a first coupling rail member 15 and a second coupling rail member 16, both of which rail members project transversely with respect to the plane 14 of the basic structure 9, and both performing a function of mutually fixed anchoring between structural elements of the apparatus as well as a sealing function with respect to the support surface 2. On the opposite side of each basic structure 9 a coupling groove 17 is provided, the dimensions of which correspond to those of the coupling rail 15, which groove 17 serves to accommodate the first coupling rail 15 of the adjacent basic structure 9. Analogously, each of the second coupling rail members 16 has associated with it a second coupling groove 18 the dimensions of which correspond to those of the rail member 16. The first and second coupling rail member (15, 16) are mounted so as to project downwardly on the same side of the basic structure 9. The first and second coupling grooves (17, 18) are disposed with the open sides of their cross sections upwardly directed on the opposite side of the basic structure 9. The altitudes of the first and second coupling rails (15; 16) are mutually different, as are the altitudes of the associated first and second coupling grooves (17; 18). At least one of the two coupling rails (here, 15) is provided with a recess 19 in the region of its distal edge, which recess is bounded on both lateral sides by a respective narrow vane.

Figure 2:
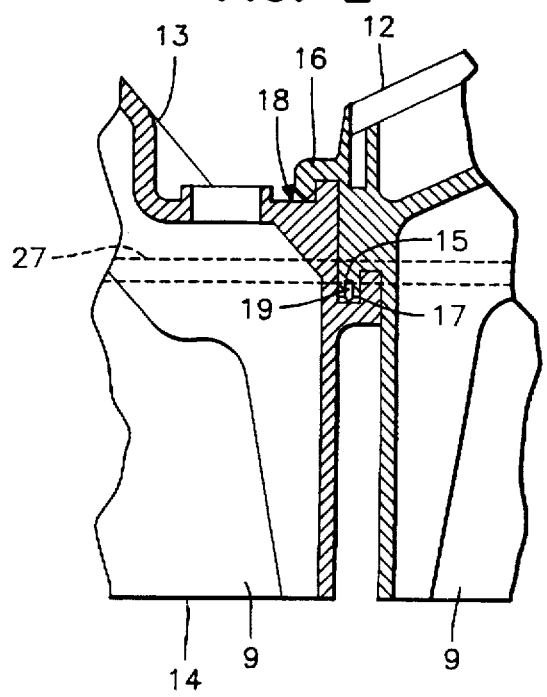
FIG. 2 is a cross section corresponding to line II—II of FIG. 1.
Figure 3:
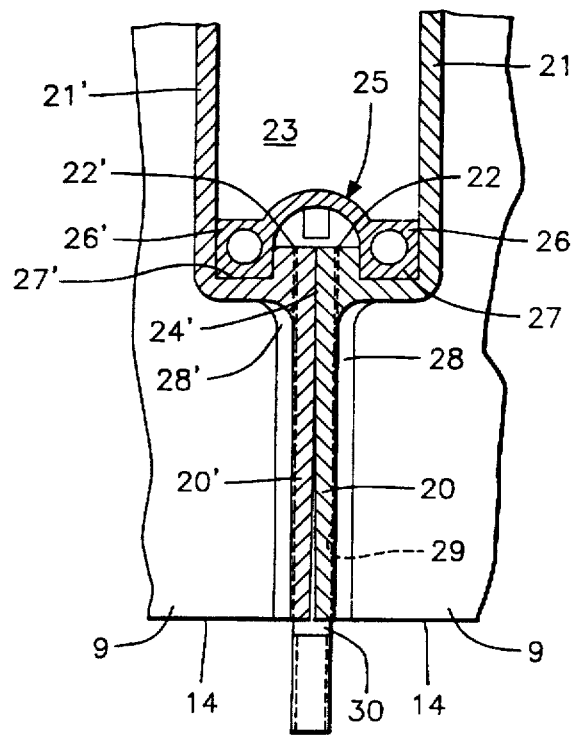
FIG. 3 is a cross section corresponding to line III—III of FIG. 1.

As seen from FIGS. 2 and 3, the dual coupling rails (15, 16) and dual coupling grooves (17, 18) are provided only on the two longitudinal sides of the basic structure 9, which sides extend parallel to the line of intersection of the planes (12, 13) of successive collector- and absorber channels. On each of the sides of the basic structure 9 which sides are transverse to the longitudinal sides, the upper portion 21 is arranged so that adjacent basic structures 9, when brought together, form a channel 23 between their respective upper regions 21 and 21'. In addition, a stepped configuration 22 is provided which extends from the lower region 20 to the upper region 21 of the wall of the basic structure 9. This wall step 22 along with the wall step 22' of the adjoining collector element forms a step, the channel 23 having a width equal to twice the width of the step. A sealing strip 25 is inserted into this channel, which strip covers the gap 24 between the lower side regions (20, 20') of the adjoining basic structures 9. Strip 25 is comprised of elastic material, e.g. silicone rubber, and has a length corresponding to that of the overall channel in the solar collector apparatus which channel is formed by the successive individual channels 23. The longitudinal edge regions of each sealing strip 25 are in the form of respective edge profiles (26, 26'), the cross sections of which match accommodating recesses (27, 27') in the wall steps (22, 22'). It may be seen from FIG. 3 that the edge profiles (26, 26') of the sealing strip 25 are hollow, and that in the embodiment shown they have a rectangular cross section with a width corresponding to the width of the associated recess (27, 27') in the wall steps (22, 22').

At least one throughgoing recess 28 is formed in the lower regions of each basic structure 9, which recess in combination with the corresponding recess 28' in the adjoining basic structure forms a throughgoing opening 29 through which a threaded bolt 30 or other fastener for fixing the collector elements to the support surface can be introduced. The central strip-shaded region (web member) joining the two edge profiles (26, 26') of the sealing strip 25 is sufficiently wide that, in the state in which the strip 25 is inserted in the channel 23, the web member extends over the upper part of the bolt 30 which projects beyond the opening 29.

FIG. 3 illustrates the ordinary case in which the lower lateral regions (20, 20') of the basic structures 9 are brought tightly together and in contact with each other. When the collector element is installed on the two inclined surfaces of an east-west roof up to the altitude of the ridge 31 (or peak) of the roof, contacting of the basic structures 9 of the collector elements in the manner illustrated is not possible. Nonetheless the ridge region can be sealed easily and securely, by installing a sealing strip having a width at the central strip-shaped (web) region between the edge profiles, which width assures that the (web) region extends over the ridge 34 of the roof.

The dimensional relationships illustrated in FIGS. 2 and 3 show that the wall step configurations (22, 22') and the recesses (27, 27') extend in planes which are at higher altitudes than the plane of the first coupling rail member 15 and the first coupling groove 17 (which groove accommodates the member 15), and at lower altitudes than the plane of the second coupling rail member 16 and the second coupling groove 18 which groove accommodates the member 16.

I claim:

1. A basic structural body for each collector element of a solar collector apparatus, said basic structural body being securely mountable on a support surface regardless of inclination thereof and comprising:

at least two mutually parallel lateral sides, a first of said lateral sides having a first coupling rail member which projects transversely with respect to a body plane of said basic structural body and which serves for fixed anchoring of said basic structural body to a laterally adjacent and similar basic structural body in such a manner as to provide a sealing effect with respect to the support surface, an opposite of said lateral sides having a first coupling groove, the dimensions of which correspond to those of the first coupling rail member, which first coupling groove serves to accommodate the first coupling rail member of a laterally adjacent basic structural body; wherein:

the first of said lateral sides further includes a second coupling rail member which projects in the same direction as the first coupling rail member, and wherein the opposite of said lateral sides further includes a second coupling groove which is associated with the second coupling rail member and has dimensions corresponding to those of said second coupling rail member.

2. The basic structural body according to claim 1, wherein said first and second coupling rail members project downward; and wherein the first and second coupling grooves are configured to open upward.

3. The basic structural body according to claim 1, wherein the first coupling rail member is disposed at a different altitude from the second coupling rail member, and the first coupling groove is disposed at a different altitude from the second coupling groove.

4. The basic structural body according to claim 1, wherein at least one of said first and second coupling rail members has a distally located recess which is bounded on each of two sides by a respective narrow vane.

5. The basic structural body according to claim 1 wherein a wall step configuration is provided on each of two longitudinal ends of the basic structural body, which longitudinal ends extend transversely to said lateral sides;

wherein said wall step configuration is disposed between an upper region and a lower region of each longitudinal end;

wherein said wall step configuration, together with a corresponding configuration on a longitudinally adjacent basic structural body, forms an individual channel with a width corresponding to approximately twice the width of a step defined by said wall step configuration and further comprising a sealing strip inserted into said individual channel, which sealing strip covers a gap between the lower regions of said basic structural body and said longitudinally adjacent basic structural body, said sealing strip being arranged so as to extend across the width of the individual channel, said strip comprising elastic material.

6. The basic structural body according to claim 5 wherein a length of the sealing strip corresponds to that of an overall channel formed by successively arranged ones of said individual channels.

7. The basic structural body according to claim 5, wherein the sealing strip includes a transition to a respective edge profile located at opposite lateral edges of said sealing strip, each edge profile having a relatively large cross section corresponding to the cross section of a recess in the wall step configuration, said recess being arranged to accommodate said edge profile.

8. The basic structural body according to claim 7 wherein each edge profile of the sealing strip is hollow.

9. The basic structural body according to claim 7, wherein each edge profile has a rectangular cross section with a profile width corresponding to a width of the recess in the wall step configuration.

10. The basic structural body according to claim 5 and further comprising:

at least one throughgoing recess in each lower region, which throughgoing recess; in combination with a similar recess in the longitudinally adjacent basic structural body, delimits a thoroughgoing opening through which fasteners for fixing the basic structural body to the support surface may pass; and a central web member joining two edge profiles of the sealing strip, said central web member being sufficiently wide that, when said sealing strip is inserted in said individual channel, said web member extends over said opening and any fastener disposed therein.

11. The basic structural body according to claim 1 and further comprising a sealing strip having two edge profiles and a central web region which extends between the two edge profiles, the width of which central web region being such that said central web region reliably spans a ridge of a roof having two inclined surfaces.

12. The basic structural body according to claim 3 and further comprising:

wall step configurations at longitudinal ends of said basic structural body and associated recesses defined by said wall step configurations, said wall step configurations and associated recesses being disposed at an altitude which is between that of the first coupling groove and that of the second coupling groove.

* * * * *